United States Patent
Li (12)

(10) Patent No.: US 6,230,561 B1
(45) Date of Patent: May 15, 2001

(54) FLOAT FOR A LEVEL SENSOR

(76) Inventor: Jui-Yang Li, No. 32, Lane 417, Ta Wan Road, Yung Kang City, Tainan Hsien (TW)

(*) Notice: Subject to any disclaimer, the term of this patent is extended or adjusted under 35 U.S.C. 154(b) by 0 days.

(21) Appl. No.: 09/003,135

(22) Filed: Jan. 6, 1998

(51) Int. Cl.⁷ .............................. G01F 23/76; G01F 23/56
(52) U.S. Cl. .................... 73/322.5; 73/319; 73/DIG. 5
(58) Field of Search ..................... 73/322.5, 319, 73/DIG. 5

(56) References Cited

U.S. PATENT DOCUMENTS

| | | | |
|---|---|---|---|
| 4,398,186 | * | 8/1983 | Statz ........................................ 73/317 |
| 5,041,812 | * | 8/1991 | Misaizu et al. ........................ 73/314 |
| 5,374,790 | * | 12/1994 | Horvath ................................. 73/313 |
| 5,886,312 | * | 3/1999 | Barmore, Jr. et al. ................. 73/313 |

* cited by examiner

Primary Examiner—Hezron Williams
Assistant Examiner—Katina M Wilson
(74) Attorney, Agent, or Firm—Rosenberg, Klein & Lee

(57) ABSTRACT

A float for a level sensor has a center through hole and a position limiting hole formed in an upper portion of the center through hole and having a larger diameter than the center through hole, and an annular hollow space opening downward. An inner annular groove is formed in a wall defined between the center through hole and the annular hollow space, and an outer annular groove is formed in an outer wall defining the annular hollow space for disposing a magnet ring, an inner gasket and an outer gasket for facilitating closing an annular cap on the two gaskets. An oval base with a magnet ring is fixed in the position limiting hole. Then this float may be combined with various types of level sensors without any extra processes or modifications.

7 Claims, 4 Drawing Sheets

FLOAT FOR A LEVEL SENSOR

BACKGROUND OF THE INVENTION

This invention relates a float for a level sensor, particularly to one applicable to various types of level sensors by combining its components in various ways without any extra processes or modifications.

A level sensor is indispensable in a large tank or a drink water dispenser for sensing the level of water in its tank so as to prevent water from being used up and subsequent danger from happening. And then a proper warning may be given out or electricity is cut off at once in that case.

A conventional level sensor shown in FIGS. 7 and 8 includes a magnetic tube 10 combined with a float 11 so that the float may activate the magnetic tube by up-and-down movement together with the level of water rising and falling so as to keep a tank in a safe condition.

The magnetic tube 10 may have different designs according to different activating points of a magnet such as illustrated in the figure, having a spring 101 surrounded by a small magnet ring 102 as an activating point for a magnet ring 12 on the float 11. The float 11 is cylindrical, having a center through hole 110 for the tube 10 to extend therein, an annular hollow space 111 opening downward. An annular groove 112 is provided in the lower open mouth of the annular hollow space 111 for fitting a magnet ring 12 therein, and two gaskets 13, 14 of different diameter are also fitted in the annular groove 112. Then an annular cap 15 provided with an inner groove 151 and an outer annular groove 152 is closed on the gaskets 13, 14 engaging the inner and the outer annular groove 151, 152, fixed securely in the annular groove 112.

In using the conventional level sensor, the float 11 is combined with the magnetic tube 10, moving up and down together with the level of water in a tank. When the float 11 moves near a certain point of the magnetic tube 10, the magnet ring 12 in the float will activate the magnet switch (not shown) to generate electric current so as to give out a signal for controlling the switch of a power source or other actions. As the float is of a definite form and shape, hardly applicable to other types of magnetic tubes 10. So a new type of float has to be made to suit to other types of level sensors, increasing production cost for makers.

SUMMARY OF THE INVENTION

This invention has been devised to offer a float for a level sensor, applicable to various types of level sensors by changing combination of its own components without any extra processes or modifications.

A feature of the invention is a position limiting oval hole formed in an upper portion of a center through hole of a float and having a larger diameter than the center through hole for placing an oval base provided with a magnet ring.

Another feature of the invention is a magnet ring fitted in a lower portion of an annular hollow space formed in the float and opening downward.

One more feature of the invention is an inner and an outer gasket fitted under the magnet ring in the lower portion of the annular hollow space and closed up by an annular cap to make this float water-tight.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
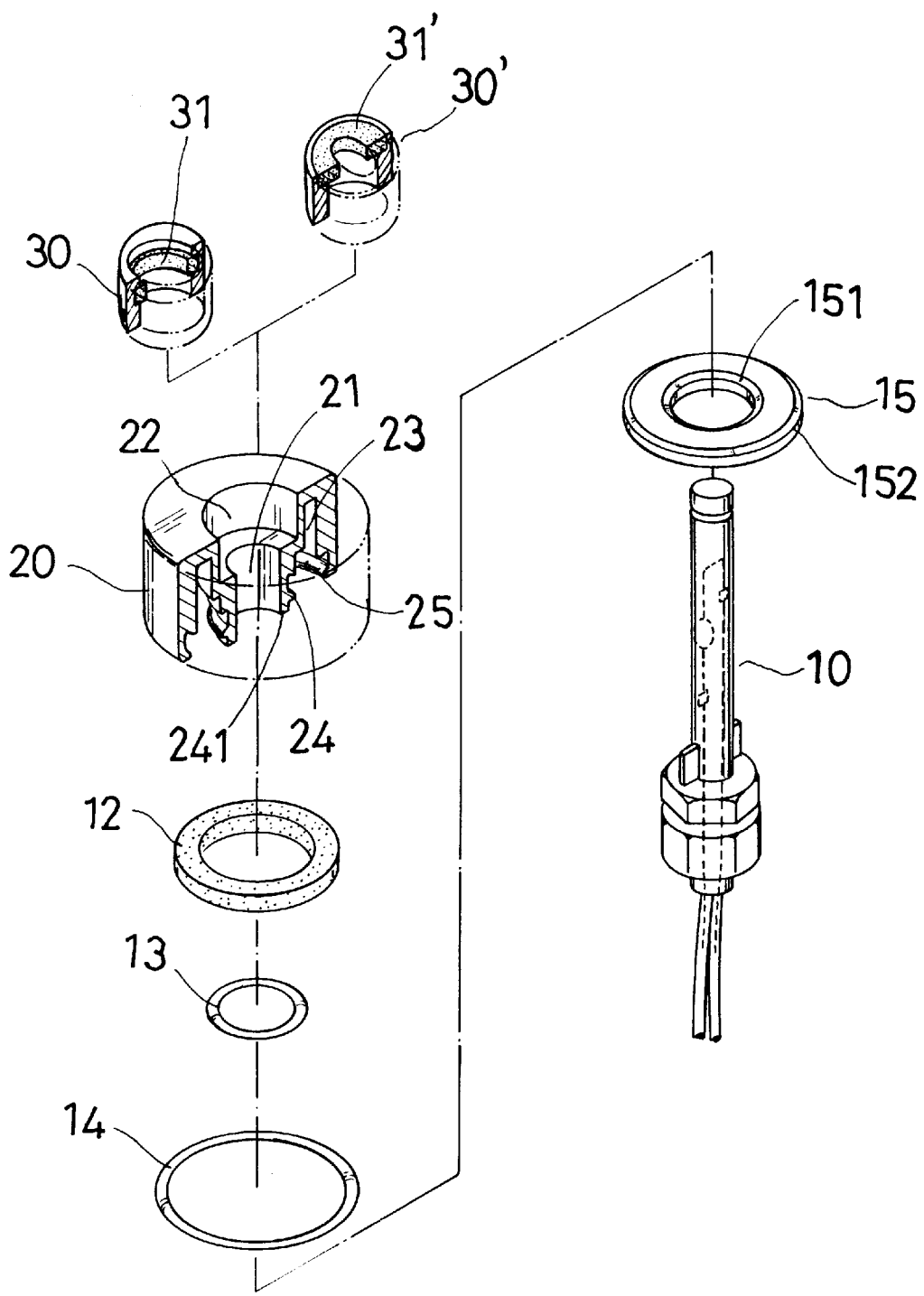
FIG. 1 is an exploded perspective view of a float for a level sensor of the present invention.

A preferred embodiment of a float 20 for a level sensor in the present invention, as shown in FIG. 1, has a cylindrical shape provided with a center through circular hole 21, and an position limiting oval hole 22 formed in an upper portion of the center through hole 21 and having a larger diameter than that of the center through hole 21. Then an oval base 30 with a circular magnet ring 31 is fitted in the position limiting oval hole 22. Alternately, an oval base 30' with an oval magnet ring 31' instead may be fitted in the position limiting oval hole 22. The float 20 further has an annular hollow space 23 opening to a lower side, with an inner annular groove 24 formed in an outer surface of the inner wall defined between the lower center oval hole 21 and the annular hollow space 23, with an outer groove formed in an inner surface of an outer annular wall.

Figure 3:
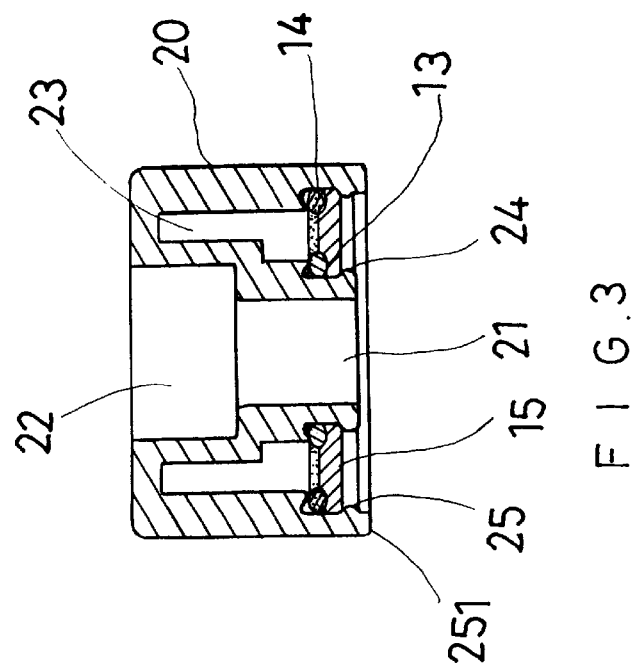
FIG. 3 is another cross-sectional view of the float for a level sensor of the present invention.
Figure 2:
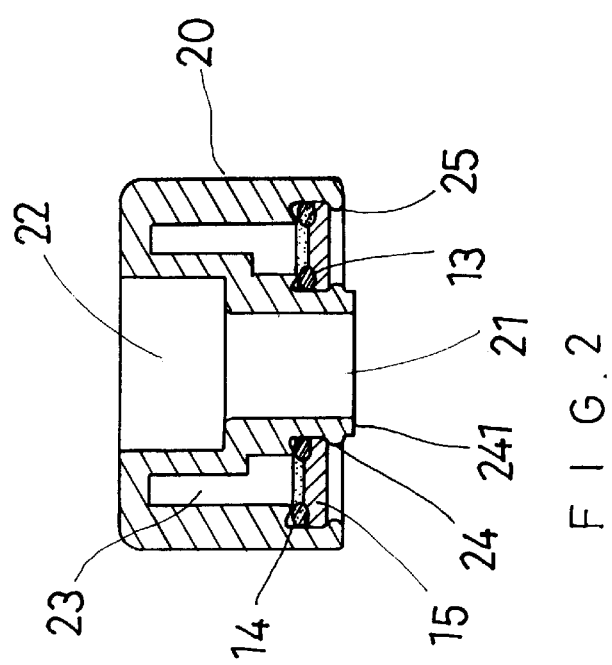
FIG. 2 is a cross-sectional view of the float for a level sensor of the present invention.

Then a magnet ring 12 is placed between the inner annular groove 24 and the outer annular groove 25 (at the same time a sleeve 26 may be fitted in the upper oval hole 22 as a conventional float). Next, an inner gasket 13 and an outer gasket 14 are placed under the magnet ring 12 and between the inner annular groove 24 and the outer annular groove 25. Then an annular cap 15 provided with an inner groove 151 and an outer groove 152 is closed on the inner and the outer gasket 13 and 14 so as to make the float 20 movable up and down together with the level of water, with FIGS. 2 and 3 referred.

Further, annular ridges—a first 241, and a second 251—may be formed respectively under the inner annular groove 24 and the outer annular groove 25 so that the inner groove 151 may engage the inner gasket 13 and positioned under the inner annular groove 24 after the annular cap 15 is closed up the lower open mouth, guiding to facilitate assemblage. And the second annular ridge 251 may guide the annular cap 15 to be positioned securely in the lower portion of the float 20.

Figure 4A:
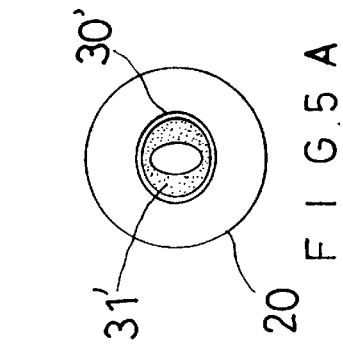
FIG. 4A is a plan view of the float for a level sensor as shown in FIG. 4.
Figure 4:
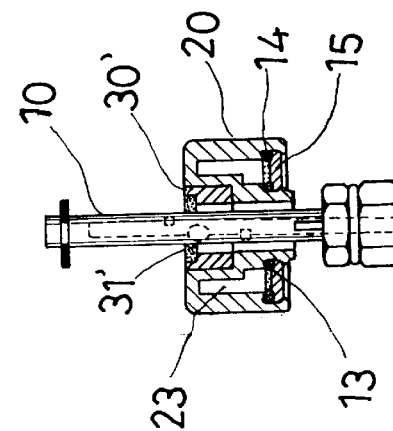
FIG. 4 is a cross-sectional view of the float for a level sensor used in a way of the present invention.
Figure 6:
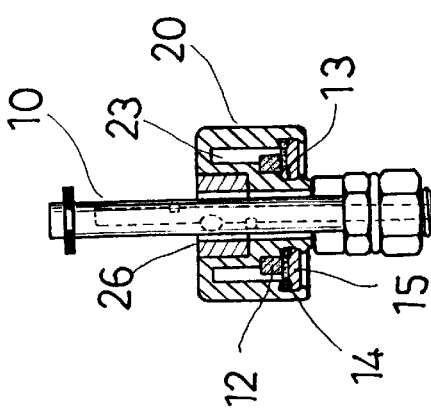
FIG. 6 is a cross-sectional view of the float for a level sensor used in another way of the present invention.
Figure 5A:
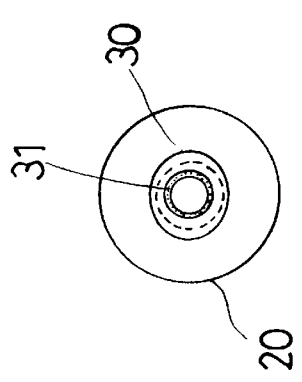
FIG. 5A is a plan view of the float for a level sensor shown in FIG. 5.
Figure 5:
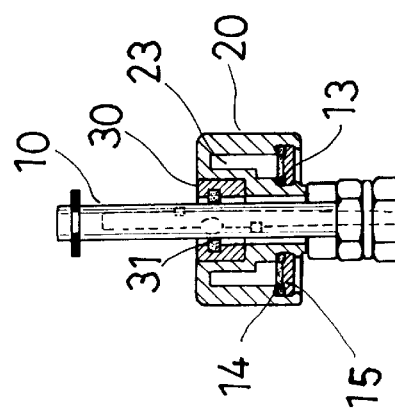
FIG. 5 is a cross-sectional view of the float for a level sensor used in another way of the present invention.
Figure 7:
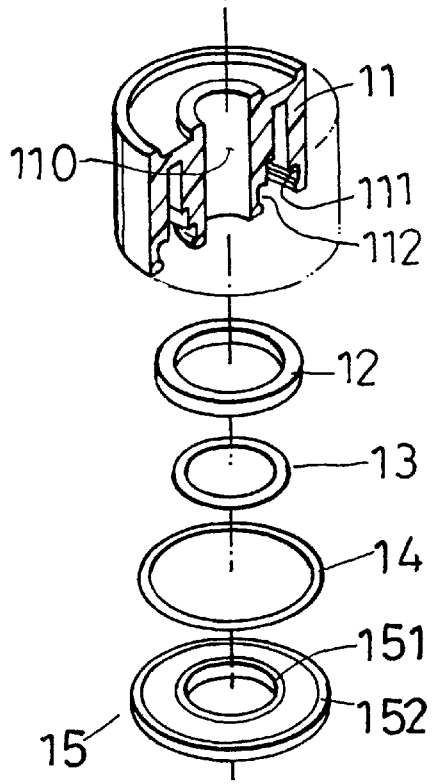
FIG. 7 is an exploded perspective view of a conventional float for a level sensor; and, FIG. 8 is a cross-sectional view of the conventional float for a level sensor.
Figure 8:
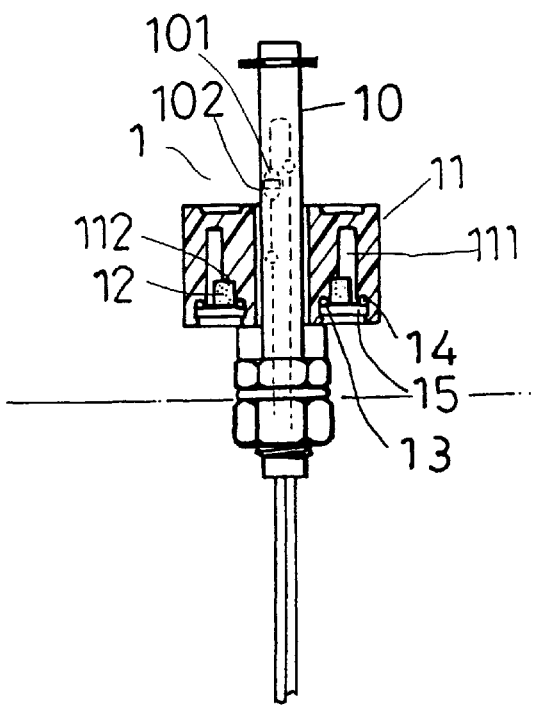

The float 20 in the present invention can be used in various ways, utilizing various combination of its components and hollow spaces it has, to correspond to various types of water level sensors. The float 20 can activate a magnetic switch in a magnetic tube 10 to generate electric current by its up-and-down movement So if the magnet ring 12 is not placed in the annular hollow space 23, either of the oval bases 30, 30' may be placed in the position limiting oval hole 22, and the circular magnet ring 31 or the oval magnet ring 31' can activate the magnet switch in the magnetic tube 10 to generated current to complete sensing the level of water, as shown in FIGS. 4, 5 and 6.

The float in the present invention may be applied to various types of level sensors, with magnet rings combinable in various ways, lowering need of many molds for different components for different floats.

While the preferred embodiment of the invention has been described above, it will be recognized and understood that various modifications may be made therein and the appended claims are intended to cover all such modifications which may fall within the spirit and scope of the invention.

What is claimed is:

1. A level sensor comprising:

(a) an axially extended magnetic tube;

(b) at least one magnetic ring member having one of a plurality of predetermined contours;

(c) a float for displaceable coupling to a magnetic tube, said float having coaxial upper and lower portions, said lower portion having formed therein a center through hole, said upper portion having formed therein a position limiting hole disposed in open communication with said center through hole, said position limiting hole being greater in at least one diametric dimension than said center through hole for receiving said magnetic ring member having at least a first preselected one of said predetermined contours;

said float having formed about said center through hole an annular wall section having an annular inner groove and an annular ridge extending therefrom, said float having formed therein annular hollow space for receiving at least a second preselected one of said predetermined contours;

(d) inner and outer annular gaskets received in said annular hollow space of said float; and, (e) an annular cap coupled to said float to enclose said annular hollow space.

2. The level sensor as recited in claim 1 wherein said float has formed about said annular hollow space an outer annular wall section, said outer annular wall section having an outer annular groove and an outer annular ridge extending therefrom.

3. The level sensor as recited in claim 1 wherein said position limiting hole is formed with an oval-shaped transaxial contour.

4. The level sensor as recited in claim 1 wherein said magnetic ring includes an oval-shaped base engaging said position limiting hole.

5. The level sensor as recited in claim 4 wherein said base has formed therein an internal groove for retentively receiving said magnetic ring.

6. The level sensor as recited in claim 1 wherein said magnetic ring is circular in contour.

7. The level sensor as recited in claim 1 wherein said magnetic ring is oval-shaped in contour.

* * * * *